S. K. OUZOUN-BOGHOSSIAN.
WATER MIXER.
APPLICATION FILED OCT. 13, 1919.
1,336,917.
Patented Apr. 13, 1920.
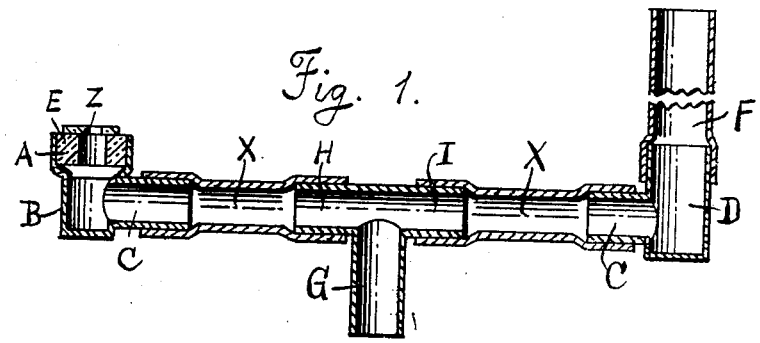
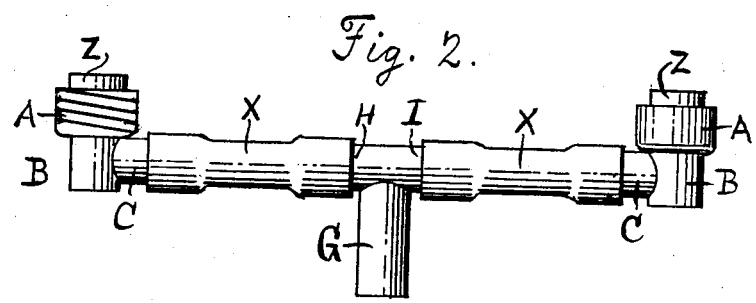
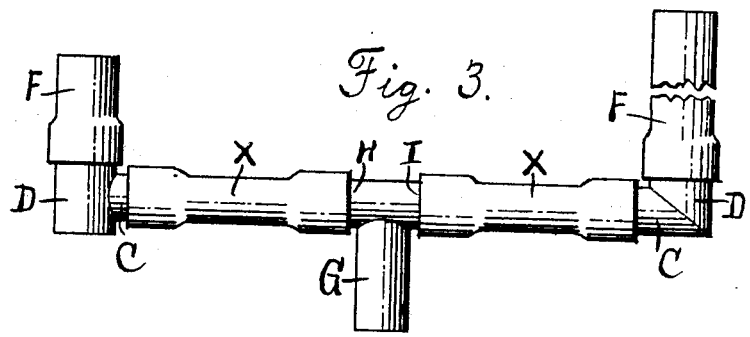
INVENTOR
S. K. Ouzoun-Boghossian

UNITED STATES PATENT OFFICE.

SISSAK K. OUZOUN-BOGHOSSIAN, OF WASHINGTON, DISTRICT OF COLUMBIA.

WATER-MIXER.

1,336,917.

Specification of Letters Patent.

Patented Apr. 13, 1920.

Application filed October 13, 1919. Serial No. 330,277.

*To all whom it may concern:*

Be it known that I, SISSAK K. OUZOUN-BOGHOSSIAN, a subject of the Sultan of Turkey, residing at Washington, in the District of Columbia, have invented certain new and useful Improvements in Water-Mixers, of which the following is a specification.

My invention relates to improvements in telescoping metallic tubular water-mixers for which I have obtained a patent in the United States, Patent No. 1,316,637, bearing date Sept. 23, 1919.

The object of my invention is to provide a telescoping tubular water-mixer the metal parts of which are telescopically connected to small connecting rubber tubes instead of the metal parts being telescopically connected together, thus enabling the use of metal tubes of the same diameter to make it, instead of the use of telescoping tubes, which will be a convenience to manufacture the same.

Another object of my invention is to provide a telescoping tubular water-mixer, the metal parts of which being telescopically connected to small rubber tubes, thus making a flexible water-mixer, which will be more readily adjusted between two hot and cold water faucets.

Another object of my invention is to provide a water-mixer with small elastic soft rubber washers to fit to the nozzles of the faucets, one over each of the inlaid rubber rings of the mouthpiece parts, which will eliminate the running water coming out through the mouthpiece parts attached to the discharge spouts of the faucets.

In the accompanying drawings, Figure 1 is a sectional front view of my improved mixer. Figs. 2 and 3 are front views of the same, but with similar mouthpiece parts.

In Fig. 1, EABC, FDC mouthpiece parts, HGI T-shape tube and X, X, rubber tubes are telescopically connected together, making the mixer flexible by the rubber tubes X, X. The Z soft elastic rubber washer is intended tightly to be fitted to the nozzle of the faucet.

In Fig. 2, the ZEABC, ZEABC mouthpiece parts, HGI T-shape tube and X, X rubber tubes are telescopically connected together. The G stem tube serving as a discharge spout to the mixer.

In Fig. 3, the FDC, FDC mouthpiece parts, HGI T-shape tube and X, X rubber tubes are telescopically connected together.

The mixers in Figs. 2 and 3 are modifications of the mixer in Fig. 1.

Having described my improvements what I desire to secure by Letters Patent of the United States and claim is:

1. An adjustable tubular water-mixer adapted to be removably attached between and on the discharge spouts of any two hot and cold water faucets, said mixer being a combination of three separate metal parts and a set of rubber members, said three metal parts consisting of one T-shape tube and two mouthpiece parts, said set of rubber members consisting of two small rubber tubes and two rubber tubular members, said three metal parts being separated and detachably connected together by said two small rubber tubes, the stem-tube of said T-shape tube serving as a discharge spout to said mixer, said two mouthpiece parts having fitted thereto said rubber tubular members, said mixer adapted to be attached to the discharge spouts of said faucets by said tubular members fitted to said mouthpiece parts, all substantially as set forth.

2. A water-mixer comprising two rubber tubes fitted to one T-shape tube, two mouthpiece parts fitted to said two rubber tubes and two rubber tubular members fitted to said two mouthpiece parts, the stem tube of said T-shape tube serving as a discharge spout to said mixer, said mixer adapted to be removably attached between and on the discharge spouts of any two hot and cold water faucets by said two rubber tubular members fitted to said mouthpiece parts, all substantially as set forth.

In testimony whereof I affix my signature.

SISSAK K. OUZOUN-BOGHOSSIAN.